(12) United States Patent  
Grealish

(10) Patent No.: US 11,489,868 B2
(45) Date of Patent: Nov. 1, 2022

(54) DYNAMICALLY INITIATING AND MANAGING AUTOMATED SPEAR PHISHING IN ENTERPRISE COMPUTING ENVIRONMENTS

(71) Applicant: Proofpoint, Inc., Sunnyvale, CA (US)

(72) Inventor: Nathan James Grealish, Allison Park, PA (US)

(73) Assignee: Proofpoint, Inc., Sunnyvale, CA (US)

( * ) Notice: Subject to any disclaimer, the term of this patent is extended or adjusted under 35 U.S.C. 154(b) by 390 days.

(21) Appl. No.: 16/718,389

(22) Filed: Dec. 18, 2019

(65) Prior Publication Data

US 2021/0075827 A1    Mar. 11, 2021

Related U.S. Application Data

(60) Provisional application No. 62/896,065, filed on Sep. 5, 2019.

(51) Int. Cl.
    *H04L 9/40*         (2022.01)
    *G06N 20/00*        (2019.01)
(52) U.S. Cl.
    CPC ......... *H04L 63/1483* (2013.01); *G06N 20/00* (2019.01); *H04L 63/1416* (2013.01)
(58) Field of Classification Search
    USPC ........................................................ 726/23
    See application file for complete search history.

(56) References Cited

U.S. PATENT DOCUMENTS

| 9,912,687 | B1* | 3/2018 | Wescoe | H04L 67/01 |
| 11,102,244 | B1* | 8/2021 | Jakobsson | H04L 51/42 |
| 11,128,649 | B1* | 9/2021 | Yeh | H04L 63/1483 |
| 11,158,207 | B1* | 10/2021 | Sadeh-Koniecpol | G06F 21/566 |
| 2015/0264084 | A1* | 9/2015 | Kashyap | H04L 63/1483 726/22 |
| 2016/0014151 | A1* | 1/2016 | Prakash | H04L 63/1483 726/22 |
| 2016/0261618 | A1* | 9/2016 | Koshelev | H04L 63/0263 |
| 2017/0286544 | A1* | 10/2017 | Hunt | G06F 21/128 |
| 2019/0028499 | A1 | 1/2019 | Cidon et al. | |

(Continued)

OTHER PUBLICATIONS

Jan. 2, 20218 (EP) Extended European Search Report—App. 20191607.9.

(Continued)

*Primary Examiner* — Sakinah White Taylor
(74) *Attorney, Agent, or Firm* — Banner & Witcoff, Ltd.

(57) ABSTRACT

Aspects of the disclosure relate to dynamic and automated spear phishing management. A computing platform may identify users to receive a simulated spear phishing message. In some instances, the computing platform may receive a very attacked persons (VAP) list and may identify the users to receive the simulated spear phishing message based on the VAP list. Based on historical message data associated with a first user, the computing platform may identify message features associated with the first user. Using a predetermined template and for a first user account linked to the first user, the computing platform may generate a first spear phishing message based on the message features. The computing platform may then send, to the first user account, the first spear phishing message.

20 Claims, 11 Drawing Sheets

(56) References Cited

U.S. PATENT DOCUMENTS

2019/0173919 A1    6/2019  Irimie et al.
2019/0260769 A1*  8/2019  Sharon ................ H04L 63/1416

OTHER PUBLICATIONS

Kumaraguru, P, et al, "Lessons from a Real World Evaluation of anti-phishing training," eCrime Researchers Summit, Oct. 1, 2008 (Oct. 1, 2008), pp. 1-12. XP055548262, Piscataway, NJ, USA, DOI: 10.1109/ECRIME.2008.4696970, ISBN: 978-1-4244-2969-1.

* cited by examiner

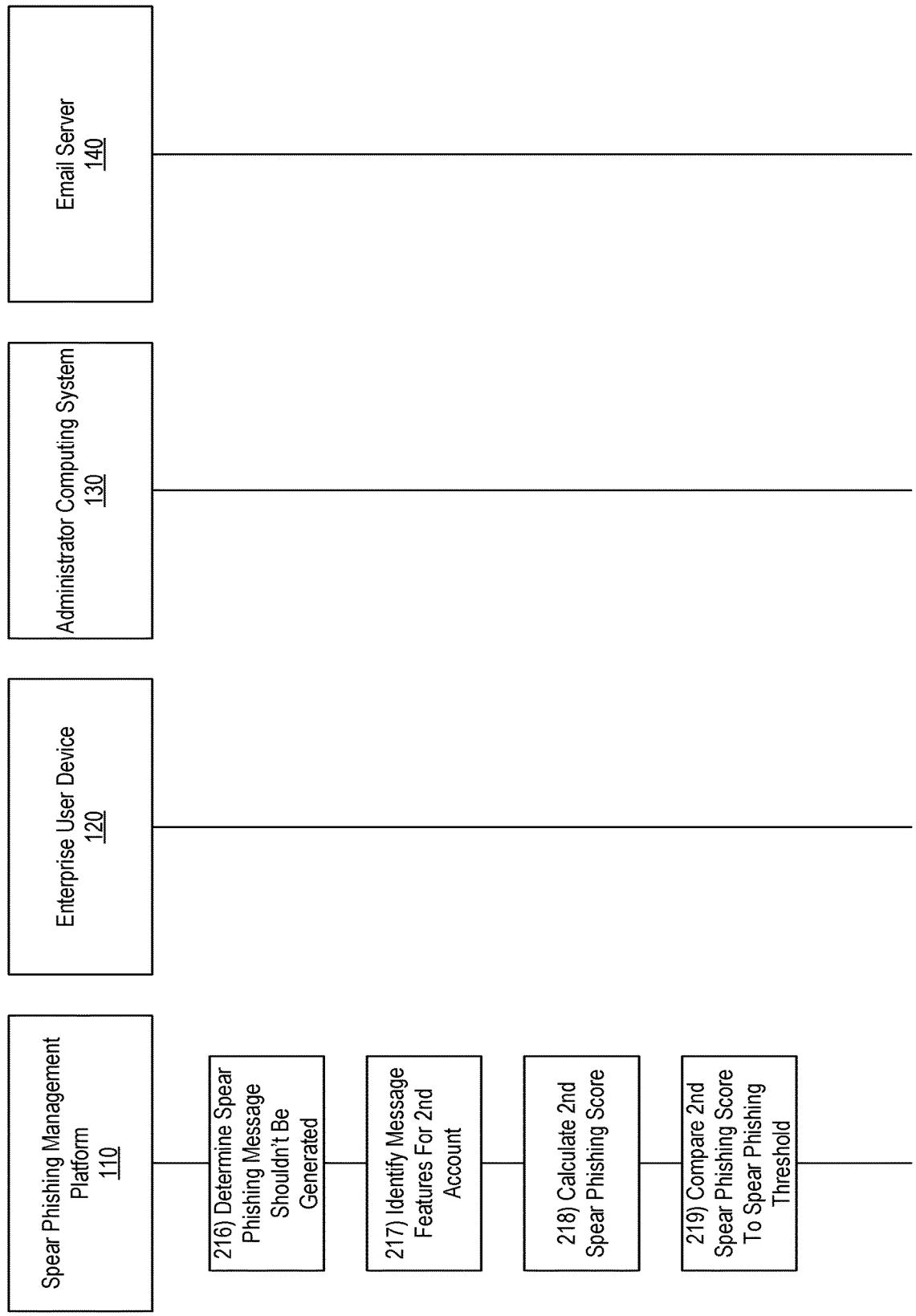

DYNAMICALLY INITIATING AND MANAGING AUTOMATED SPEAR PHISHING IN ENTERPRISE COMPUTING ENVIRONMENTS

CROSS-REFERENCE TO RELATED APPLICATIONS

This application claims the benefit of and priority to U.S. Provisional Patent Application Ser. No. 62/896,065, filed Sep. 5, 2019, and entitled "Automated Spear Phishing," which is incorporated by reference herein in its entirety.

TECHNICAL FIELD

Aspects of the disclosure relate to systems for message processing and display, data processing methods, machine learning systems, and communication systems and networks. In particular, one or more aspects of the disclosure relate to using machine learning to dynamically initiate and manage automated spear phishing in enterprise computing environments.

BACKGROUND

Increasingly, organizations face various cybersecurity threats through electronic communications. More specifically, individuals (e.g., employees and/or customers of an enterprise organization) may be vulnerable to spear phishing attacks, which may be highly personalized messages from an apparently trustworthy source, that encourage an individual to perform unsafe actions (e.g., click a link and/or access a site that harbors malicious code, requests sensitive or confidential information, and/or installs malware). Many enterprise organizations make efforts to educate enterprise users about cybersecurity risks like spear phishing. Because spear phishing involves using personal details to elicit emotional reactions from individuals, however, it may be difficult to train users to recognize and avoid spear phishing attacks. This problem may be particularly complex for large enterprise organizations with large user bases, as the personalized nature of spear phishing attacks may make it especially difficult to train a large set of different enterprise users to recognize such attacks. These issues are further compounded when trying to balance and optimize the providing of user training and the ensuring of network security with the consumption of computing resources, such as the processing power and network bandwidth, that may be required to deliver such training and provide such security.

SUMMARY

Aspects of the disclosure provide technical solutions that overcome one or more of the technical problems described above and/or other technical challenges. For instance, one or more aspects of the disclosure relate to using machine learning to dynamically initiate and manage automated spear phishing in enterprise computing environments.

In accordance with one or more embodiments, a computing platform having at least one processor, a communication interface, and memory may identify a plurality of users to receive one or more simulated spear phishing messages. Based on historical message data associated with a first user of the plurality of users identified to receive the one or more simulated spear phishing messages, the computing platform may identify message features of messages associated with the first user. Using a predetermined template and for a first user account linked to the first user, the computing platform may generate a first spear phishing message based on the message features of the messages associated with the first user. Then, the computing platform may send, to the first user account, the first spear phishing message.

In some embodiments, prior to identifying the plurality of users to receive the one or more simulated spear phishing messages, the computing platform may receive a very attacked persons (VAP) list. In these embodiments, the computing platform may identify the plurality of users to receive the one or more simulated spear phishing messages based on the VAP list. In some embodiments, the computing platform may update, at a predetermined interval, the VAP list.

In some embodiments, the computing platform may determine a spear phishing score for the first user account linked to the first user. Based on a determination that the spear phishing score for the first user account linked to the first user exceeds a predetermined threshold, the computing platform may determine that the first spear phishing message should be generated.

In some embodiments, the computing platform may identify the plurality of users to receive the one or more simulated spear phishing messages based on each user of the plurality of users having security posture characteristics that meet predetermined security posture criteria. In some embodiments, the computing platform may receive first user interaction information indicating an initial interaction with the first spear phishing message. In response to receiving the first user interaction information, the computing platform may send, to the first user account, a message indicating a first spear phishing training module that the first user should complete.

In some embodiments, the computing platform may receive second user interaction information indicating a second interaction with the first spear phishing message. In response to receiving the second user interaction information, the computing platform may send, to the first user account, a message indicating that the first user must complete a second spear phishing training module.

In one or more embodiments, the message features of the messages associated with the first user may include one or more of: a quantity of messages received from external accounts, a quantity of messages received from internal accounts, information about the external accounts, information about the internal accounts, an average number of attachments, information about the attachments, the attachments themselves, an average number of links, information about the links, the links themselves, or an average number of replies sent on a message string.

In one or more embodiments, the computing platform may generate the spear phishing message by: (1) automatically selecting the predetermined template, (2) directing an administrator computing system to cause display of the predetermined template, (3) receiving user input indicating text to be included in the first spear phishing message, and (4) creating the first spear phishing message based on the user input and the predetermined template. In one or more embodiments, the computing platform may receive a reply message to the first spear phishing message from the first user account. Using one or more natural language processing (NLP) algorithms, the computing platform may analyze the reply message. Based on the NLP analysis of the reply message, the computing platform may generate a second spear phishing message. The computing platform may send, to the first user account, the second spear phishing message.

In some embodiments, content of the first spear phishing message may have a first level of specificity that is determined by the computing platform based on the message features of the messages associated with the first user, and content of the second spear phishing message may have a second level of specificity that is greater than the first level of specificity and determined by the computing platform based on the message features of the messages associated with the first user.

In some embodiments, the computing platform may identify, by accessing an internal database configured to store personal details about the first user, personal details corresponding to the first user. In addition, generating the first spear phishing message may include generating, based in part on the personal details corresponding to the first user, the first spear phishing message.

In some embodiments, the computing platform may select, based on the message features of the messages associated with the first user, the predetermined template prior to generating the first spear phishing message based on the message features.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for using machine learning to dynamically initiate and manage automated spear phishing in enterprise computing environments in accordance with one or more example embodiments;

DETAILED DESCRIPTION

Figure 1:
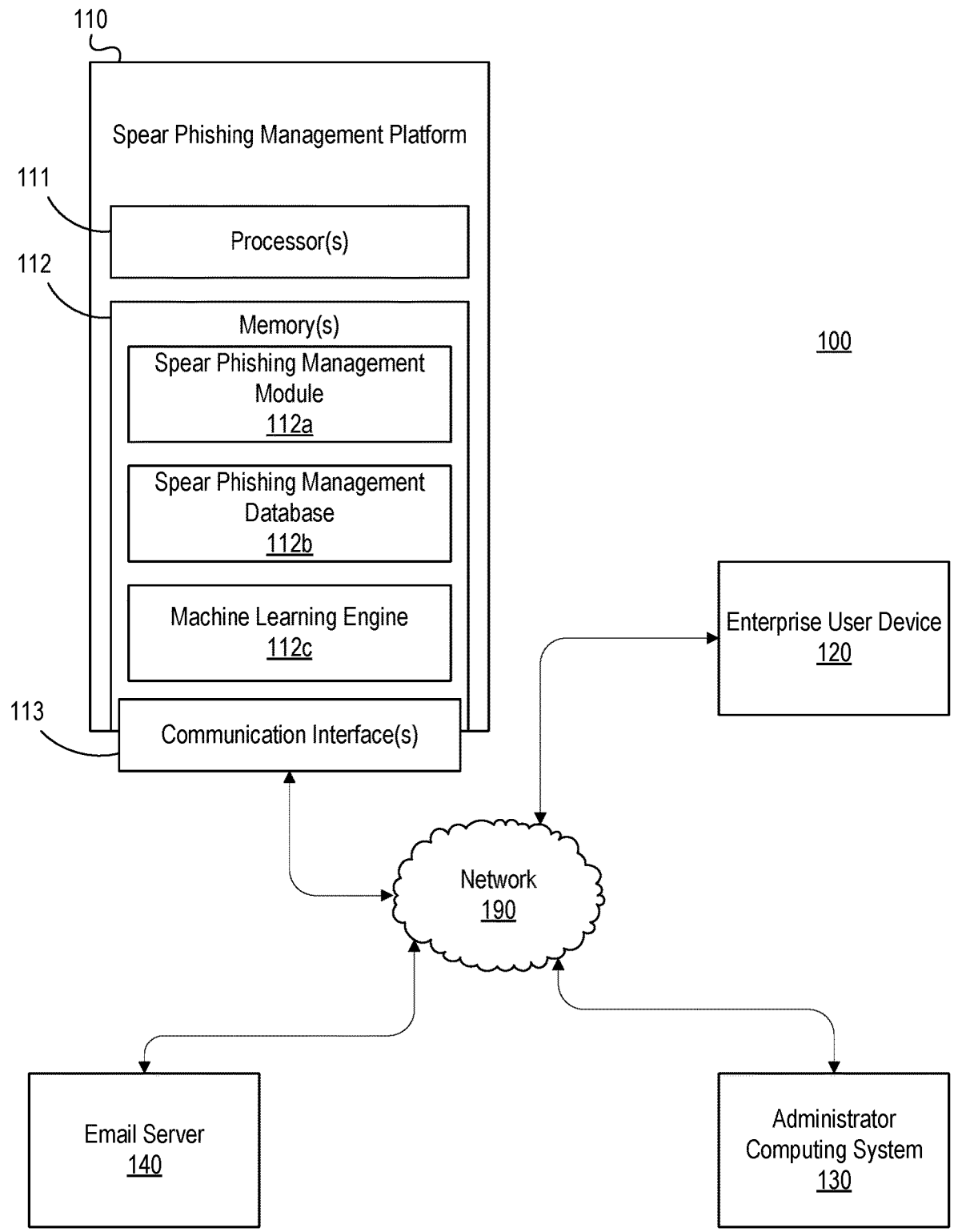
FIG. 1 depicts an illustrative operating environment for using machine learning to dynamically initiate and manage automated spear phishing in enterprise computing environments in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Spear phishing emails may be highly personalized emails sent to employees of an enterprise organization and/or other computer users from an apparently trusted source. These emails may encourage a target user to perform unsafe actions such as clicking on a link to a website harboring malicious code, asking him or her to divulge sensitive information and/or login credentials, install malware onto his or her computing device, or the like. In some instances, spear phishing emails may be designed to collect sensitive information that may be resold and/or subsequently used to attempt more sophisticated follow-up spear phishing attacks, which may then target high-value users (e.g., organization executives, managers, finance and/or accounting officers, or the like).

One or more aspects of this disclosure relate to systems and methods for dynamically initiating and simulating realistic, sophisticated phishing attacks. For example, one or more of the techniques described herein involve scanning and scoring emails in a specific user's inbox to create a user-specific profile for the specific user. In this example, the user-specific profile then may be used to automatically generate and send personalized spear phishing messages to the user, so as to raise awareness and train him or her to recognize such messages in the future.

By initiating and simulating spear phishing attack messages, the systems and methods described herein may strengthen network security and personal security by preventing and/or reducing the success of attempted spear phishing attacks (e.g., by providing targeted training to the individual users who may be identified as being the most susceptible to successful attacks). Furthermore, these systems and methods may optimize a balance between maximizing network security and minimizing an amount of processing power needed to perform the methods described herein. For example, by identifying only the most susceptible individuals and providing them with timely and targeted spear phishing messages and/or training, computing resources may be conserved (e.g., by avoiding sending messages and/or providing additional training to other users who are not particularly susceptible). These and other features are described further in more detail in the following description.

FIG. 1 depicts an illustrative operating environment for using machine learning to dynamically initiate and manage automated spear phishing in enterprise computing environments in accordance with one or more example embodiments. Referring to FIG. 1, computing environment 100 may include various computer systems, computing devices, networks, and/or other operating infrastructure. For example, computing environment 100 may include a spear phishing management platform 110, an enterprise user device 120, an administrator computing system 130, an email server 140, and a network 190.

Network 190 may include one or more wired networks and/or one or more wireless networks that interconnect spear phishing management platform 110, enterprise user device 120, administrator computing system 130, email server 140, and/or other computer systems and/or devices. In addition, each of spear phishing management platform 110, enterprise user device 120, administrator computing system 130, and email server 140 may be special purpose computing devices configured to perform specific functions, as illustrated in greater detail below, and may include specific computing components such as processors, memories, communication interfaces, and/or the like.

Spear phishing management platform 110 may include one or more processor(s) 111, one or more memory(s) 112, and one or more communication interface(s) 113. In some instances, spear phishing management platform 110 may be made up of a plurality of different computing devices, which may be distributed within a single data center or a plurality of different data centers. In these instances, the one or more processor(s) 111, one or more memory(s) 112, and one or more communication interface(s) 113 included in spear phishing management platform 110 may be part of and/or otherwise associated with the different computing devices that form spear phishing management platform 110.

In one or more arrangements, processor(s) 111 may control operations of spear phishing management platform 110. Memory(s) 112 may store instructions that, when executed by processor(s) 111, cause spear phishing management platform 110 to perform one or more functions, as discussed below. Communication interface(s) 113 may include one or more wired and/or wireless network interfaces, and communication interface(s) 113 may connect spear phishing management platform 110 to one or more networks (e.g., network 190) and/or enable spear phishing management platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause spear phishing management platform 110 to perform various functions) and/or databases (which may, e.g., store data used by spear phishing management platform 110 in performing various functions). For example, memory(s) 112 may store and/or otherwise provide a spear phishing management module 112a, a spear phishing management database 112b, and a machine learning engine 112c. In some instances, spear phishing management module 112a may store instructions that cause spear phishing management platform 110 to identify message features associated with a particular user and prepare spear phishing messages to be sent to that user accordingly, and/or other instructions that cause spear phishing management platform 110 to execute one or more other functions described herein. Additionally, spear phishing management database 112b may store data that is used by spear phishing management platform 110 in preparing spear phishing messages directed to user accounts associated with a VAP list and/or in executing one or more other functions described herein. Furthermore, machine learning engine 112c may store instructions and/or data that may cause and/or be used by spear phishing management platform 110 to identify message features associated with a particular user, prepare spear phishing messages to be sent to that user, and/or execute one or more other functions described herein.

Enterprise user device 120 may be configured to be used by an individual (who may, e.g., be an employee of an organization). In some instances, enterprise user device 120 may be used by an enterprise user of an enterprise organization who is included on a VAP list associated with the enterprise organization. For instance, enterprise user device 120 may be used by an enterprise user such as an organization president, executive, or other enterprise user listed on a VAP list for the organization (e.g., based on the user's message interaction habits, job title, powers within the organization, access to confidential information, quantity of sent and/or received emails, or the like). In some instances, enterprise user device 120 may be configured to present one or more user interfaces associated with an electronic messaging application, receive input composing new messages, display content associated with received messages, display alerts and/or training modules, and/or otherwise facilitate sending, receiving, and/or otherwise exchanging messages and/or other data with one or more other enterprise user devices (who may, e.g., be connected to the enterprise user device 120 via an internal or external network connection).

Administrator computing system 130 may be configured to be used by an administrative user (who may, e.g., a cybersecurity analyst associated with an enterprise organization operating spear phishing management platform 110). Administrator computing system 130 may be configured to present one or more user interfaces associated with an administrative dashboard, receive and/or display one or more alerts, and/or otherwise facilitate monitoring and management of one or more systems and/or devices included in computing environment 100. In one or more instances, the administrator computing system 130 may be configured to receive user input and generate, based on the user input, one or more spear phishing message templates. In addition, such templates then may be populated, based on message features determined for a plurality of identified users (e.g., the user of enterprise user device 120, or the like), so as to generate simulated spear phishing messages.

Email server 140 may include one or more computing systems and/or devices (e.g., servers, server blades, computers, or the like) configured to facilitate transmission of electronic messages between user accounts. In some instances, the email server 140 may be configured to facilitate transmission of internal messages (e.g., between multiple employees of the organization controlling spear phishing management platform 110) and/or external messages (e.g., between an employee of the organization controlling spear phishing management platform 110 and a third-party user and/or device not associated with the organization). In some instances, the email server 140 may obtain necessary permissions and may maintain a record of previous communications conducted over a predetermined period of time.

Figure 2A:
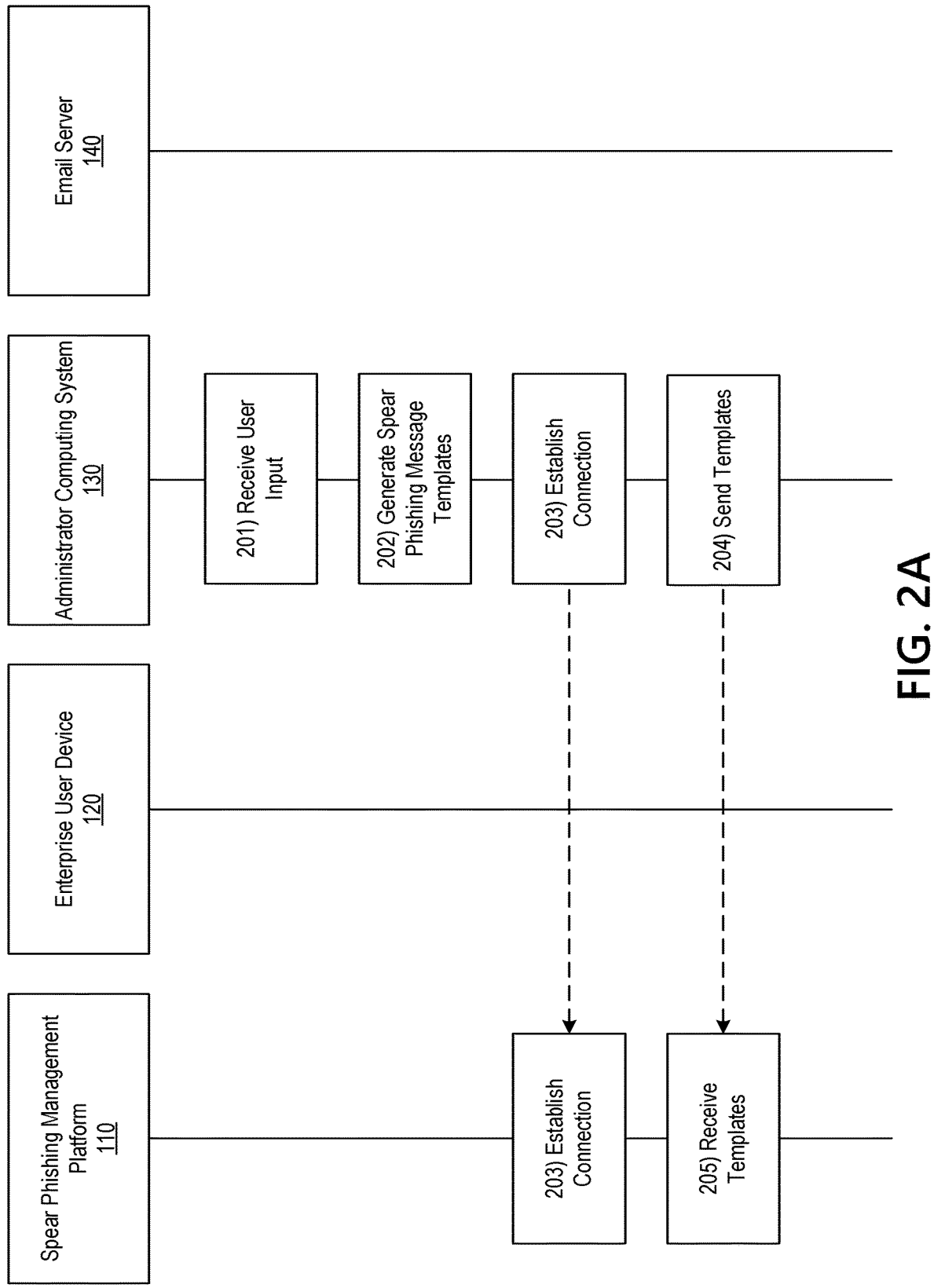

FIGS. 2A-2H depict an illustrative event sequence for using machine learning to dynamically initiate and manage automated spear phishing in enterprise computing environments in accordance with one or more example embodiments. Referring to FIG. 2A, at step 201, administrator computing system 130 may receive user input defining one or more properties and/or features of one or more spear phishing message templates and/or user input that might otherwise be used by administrator computing system 130 in generating one or more spear phishing message templates. In some instances, in receiving the user input, the administrator computing system 130 may receive user input defining one or more properties and/or features of one or more types of messages that may be typically transmitted to and from an enterprise organization (e.g., shipping orders, vendor invoices, offers for sale, or the like). In one or more instances, the administrator computing system 130 may receive the user input from an individual user (e.g., a cybersecurity analyst and/or administrator of the enterprise organization associated with spear phishing management platform 110).

In some instances, instead of or in addition to receiving such user input at step 201, the administrator computing system 130 may automatically access historical message data (e.g., messages sent over the past three months, or the like) that may, for example, be stored by the email server 140. Subsequently, the administrator computing system 130 may automatically generate the one or more spear phishing message templates based on the automatically accessed historical message data. In some instances, in accessing the historical message data, the administrator computing system 130 may use and/or select only messages that were sent and/or received during a predetermined time period (which may, e.g., be automatically determined or manually defined as being an ideal time period that balances accuracy with computing load, data management, and/or data storage).

Additionally or alternatively, after the administrator computing system 130 accesses the historical message data to automatically generate the one or more spear phishing message templates based on the historical message data, the administrator computing system 130 may display a prompt for additional user input and/or confirmation that the selected time period is appropriate and/or that the historical message data is the proper data source for generating the simulated spear phishing messages.

At step 202, the administrator computing system 130 may generate the one or more spear phishing message templates (e.g., based on the user input and/or the historical message data received and/or accessed at step 201). For example, in generating the spear phishing message templates, the administrator computing system 130 may generate message templates that may be populated with information specific to a particular user (e.g., an individual on a VAP list), which then may be sent to the particular user, as illustrated below. In one or more instances, in generating the one or more spear phishing message templates, the administrator computing system 130 may generate templates for different modes of communication (e.g., text message templates, email templates, templates for messages sent via a social networking site and/or app, or the like). In one or more instances, in generating the one or more spear phishing message templates, the administrator computing system 130 may prioritize certain templates for generation to balance available computing resources (e.g., available storage and/or processing power) with likelihood of success as a spear phishing message (e.g., based on a determination that the certain templates are more effective than others in appearing genuine to their recipients).

In one or more instances, once the administrator computing system 130 generates the one or more spear phishing message templates, it might not continually repeat step 202 (e.g., which may conserve computing resources and/or network bandwidth). In other instances, the administrator computing system 130 may dynamically update the one or more spear phishing message templates in real time as additional message data and/or user input is received (e.g., which may result in more realistic and/or convincing simulations of spear phishing messages). Additionally or alternatively, the administrator computing system 130 may update the one or more spear phishing message templates after a particular duration (e.g., once per week or the like), or may update the templates regularly to reflect message data sent and/or received over a predetermined period (e.g., the last three months or the like). In some instances, in addition to or as an alternative to generating the one or more spear phishing message templates at steps 201 and 202, the one or more spear phishing message templates may be automatically generated, using similar methods to those described above, by the spear phishing management platform 110.

As an illustrative example, at step 202, the administrator computing system 130 may generate a spear phishing message template based on shipping orders that may include one or more fields and/or other sections for price, quantity, delivery address, payment information, or the like. As illustrated in greater detail below, the one or more fields and/or other sections of the spear phishing message template may ultimately be populated with user specific information so as to simulate one or more spear phishing emails for a given user for cybersecurity training purposes.

At step 203, the administrator computing system 130 may establish a connection with the spear phishing management platform 110. In some instances, in establishing a connection with the spear phishing management platform 110, the administrator computing system may establish a first connection with the spear phishing management platform 110 to link the administrator computing system 130 with the spear phishing management platform 110. In one or more instances, the administrator computing system 130 may identify whether or not a connection is already established with the spear phishing management platform 110. If a connection is already established with the spear phishing management platform 110, the administrator computing system might not attempt to re-establish the first connection. However, if a connection is not already established with the spear phishing management platform 110, the administrator computing system 130 may establish the first connection as described herein.

At step 204, the administrator computing system 130 may send, share, or otherwise provide the one or more spear phishing message templates to the spear phishing management platform 110. In one or more instances, the administrator computing system 130 may send the one or more spear phishing message templates to the spear phishing management platform 110 while the first connection is established.

At step 205, the spear phishing management platform 110 may receive or otherwise access the one or more spear phishing message templates from the administrator computing system 130. In one or more instances, the spear phishing management platform 110 may receive the one or more spear phishing message templates from the administrator computing system 130 via the communication interface 113 and while the first connection is established.

Figure 2B:
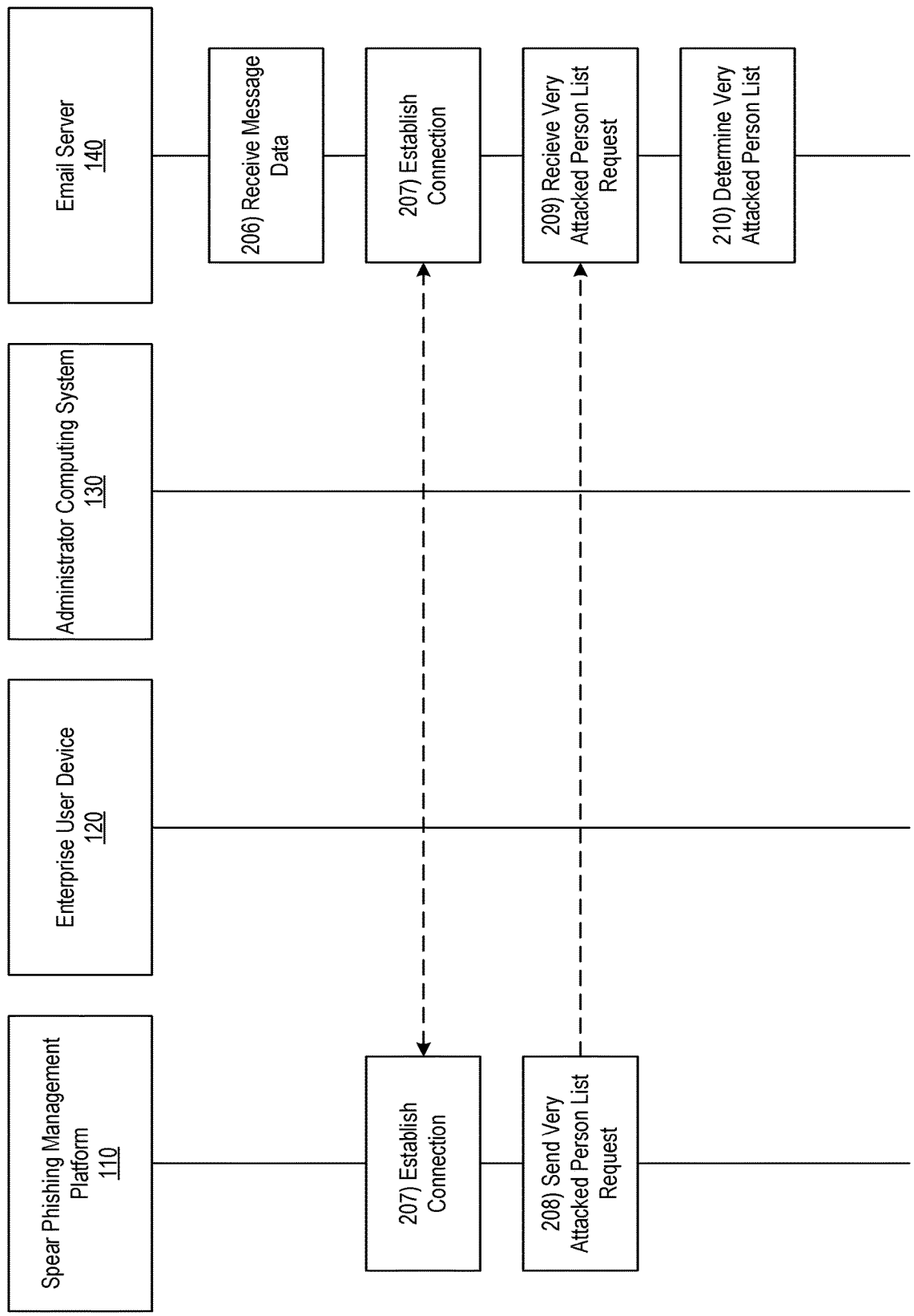

Referring to FIG. 2B, at step 206, the email server 140 may receive or otherwise access message data, which may in some instances, be and/or include the message data described above with regard to steps 201 and 202. In one or more instances, in receiving the message data, the email server 140 may access and store messages that were transmitted and/or received both internally and externally via user accounts that are hosted by and/or otherwise associated with the enterprise organization. In these instances, the email server 140 may store message data for a predetermined time period (e.g., three months) and then may delete the message data upon expiration of the predetermined time period. In doing so, the email server 140 may maintain an accurate representation of correspondence related to the enterprise organization and may also maximize storage resources by regularly deleting old message data to make room for new message data. In one or more instances, all correspondence for the enterprise organization may pass through the email server 140 in route to its intended recipient(s), and the email server 140 may store the message data as it is received.

At step 207, the spear phishing management platform 110 may establish a connection with the email server 140. In one or more instances, the spear phishing management platform 110 may establish a second connection with the email server 140 to link the spear phishing management platform 110 to the email server 140. In some instances, the spear phishing management platform 110 may identify whether or not a connection is already established with the email server 140. If a connection is already established with the email server 140, the spear phishing management platform 110 might not re-establish the second connection. If a connection has not yet been established, the spear phishing management platform 110 may establish the second connection with the email server 140 as described herein.

At step 208, the spear phishing management platform 110 may generate and send, share, or otherwise provide a request for a VAP list (e.g., to email server 140). In generating the request for the VAP list, the spear phishing management platform 110 may generate a request for a list of employees of the enterprise organization who may be most susceptible to a spear phishing attack and/or employees of the enterprise organization who, if they fell victim to a spear phishing attack, would have a significant impact on the employee and/or the organization (e.g., executives, finance officers, or the like). After generating the request for the VAP list, the spear phishing management platform 110 may send the request for the VAP list to the spear phishing management platform 110. In one or more instances, the spear phishing management platform 110 may periodically send requests for the VAP list at a regular predetermined interval (e.g., once a week, or the like) so as to maintain a current list of users who may be most vulnerable to an attack. In one or more instances, the spear phishing management platform 110 may send the request(s) for the VAP list to the spear phishing management platform 110 via the communication interface 113 and while the second data connection is established. Alternatively, in some arrangements, the spear phishing management platform 110 may generate and/or maintain the VAP itself (e.g., using the methods described below with regard to the email server 140 at step 210) based on message data received from email server 140 and/or user data received from administrator computing system 130.

At step 209, the email server 140 may receive or otherwise access the request for the VAP list from the spear phishing management platform 110. In one or more instances, the email server 140 may receive the VAP list from the spear phishing management platform 110 while the second data connection is established.

At step 210, the email server 140 may generate the VAP list. In one or more instances, in determining the VAP list, the email server 140 may analyze the message data received at step 206 to generate the VAP list based on user-specific data, such as user-specific message interaction habits (e.g., has a user fallen victim to a phishing scam before; if so, have they fallen victim to a phishing scam more than once; if so, how recently and/or frequently have they fallen victim to a phishing scam), user-specific job title(s) and/or role(s) within the enterprise organization, user-specific statistics such as the quantity of emails sent and/or received by a given user, user-specific security posture information (which may, e.g., identify security strengths and/or weaknesses associated with each user), or the like. For example, if a particular individual has fallen for every spear phishing email he or she has received, the email server 140 may add that particular individual to the VAP list. In contrast, if the particular individual has never fallen for a spear phishing email, the email server 140 might not add that particular individual to the VAP list. With regard to job title and/or role, the email server 140 may determine that employees at or above a particular level in a hierarchy of the enterprise organization may be more susceptible to an attack (e.g., because they may have a higher level of authority to approve orders, payments, transactions, decisions, or the like) when compared to an employee below that particular level. For example, the email server 140 may add a president of the enterprise organization to the VAP list, but might not add an entry level employee. With regard to message quantity, the email server 140 may identify that a first individual who sends and/or receives a number of emails that exceeds a predetermined threshold (e.g., per day, per week, or the like) may be more susceptible to an attack than a second individual who sends and/or receives a number of emails that does not exceed the predetermined threshold. Accordingly, the email server 140 may, in this case, add the first individual to the VAP list but might not add the second individual to the VAP list. In instances where the spear phishing management platform 110 generates the VAP list itself (e.g., rather than the email server 140), the actions described above with regard to generation of the VAP list by the email server 140 may be performed by the spear phishing management platform 110 (e.g., message data analysis, user selection, and/or the like).

In one or more instances, the email server 140 may identify these predetermined thresholds (e.g., quantity of spear phishing emails interacted with, hierarchy level, sent/received emails, or the like) based on user input. Additionally or alternatively, the email server 140 may automatically identify these predetermined thresholds so as to balance network security with the computational cost of adding an individual to the VAP list (which may, e.g., be the cost of performing the steps described below with regard to generation of simulated spear phishing messages). In some instances, the email server 140 may dynamically adjust the predetermined thresholds so as to maintain VAP lists of a particular size. For example, if the email server 140 has a target size of one hundred individuals or 1% of the organization, but identifies, based on current thresholds, that the VAP list contains one hundred and twenty individuals or 1.2% of the organization, the email server 140 may increase one or more of the thresholds to reduce the size of the VAP list. In contrast, if the email server 140 has a target size of one hundred individuals or 1% of the organization but identifies, based on current thresholds, that the VAP list contains only eighty individuals or 0.8% of the organization, the email server 140 may decrease one or more of the thresholds to increase the size of the VAP list. In some instances, the email server 140 may maintain target sizes for each of the categories used to identify whether an individual should be added to the VAP list (e.g., quantity of phishing emails interacted with, hierarchy level, sent/received emails, or the like), and may perform similar dynamic threshold adjustments as described above based on actual quantities of individuals to be added to the VAP list in comparison to the target quantities for each category. The criteria described here for determining whether or not an individual should be added to the VAP list are not exhaustive and other criteria may be used by the email server 140 to make the determination in additional or alternative arrangements.

Figure 2C:
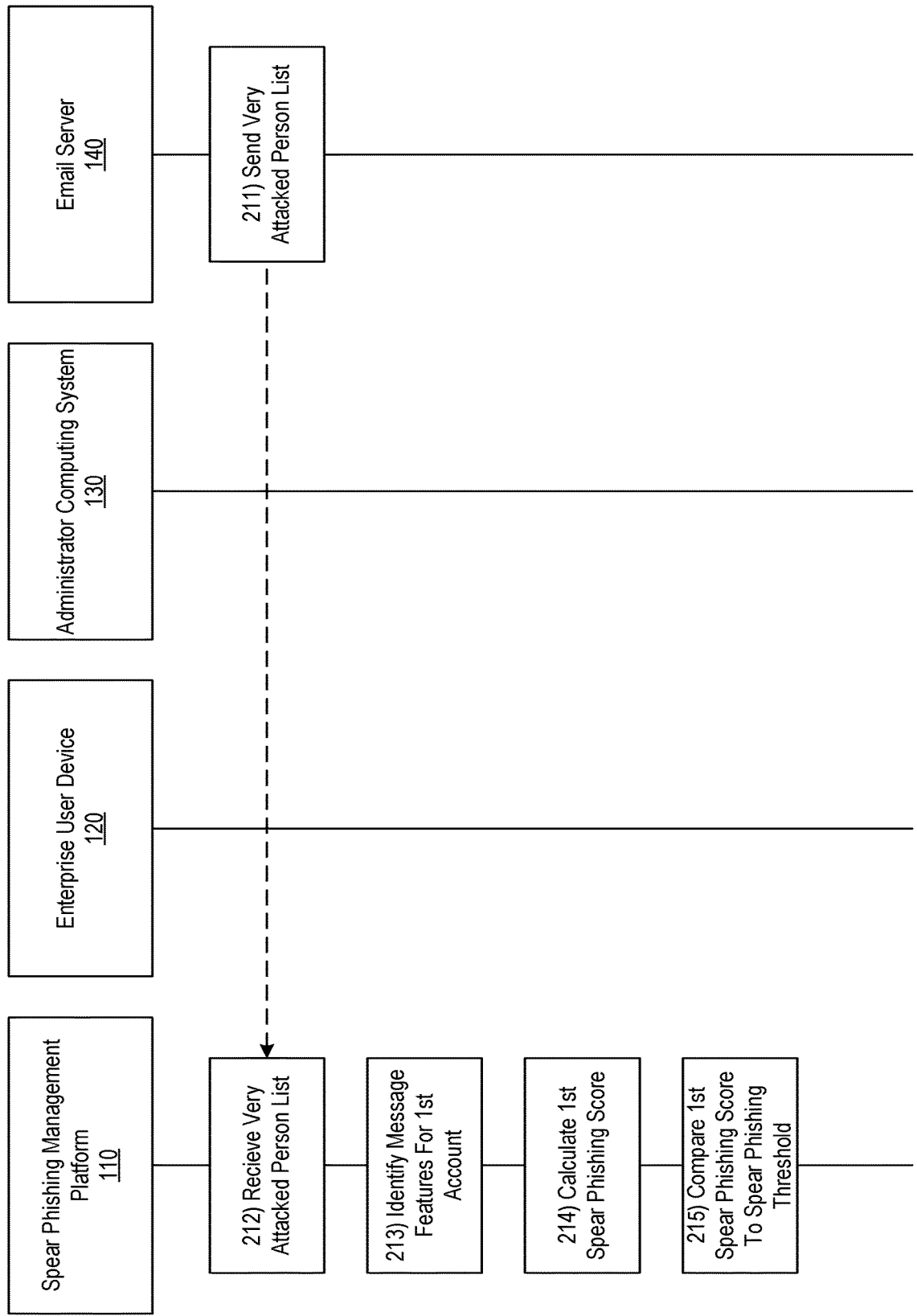

Referring to FIG. 2C, at step 211, the email server 140 may send, share, or otherwise provide the VAP list, which was generated at step 210, to the spear phishing management platform 110. In one or more instances, the email server 140 may send the VAP list to the spear phishing management platform 110 while the second data connection is established.

At step 212, the spear phishing management platform 110 may receive or otherwise access the VAP list from the email server 140. In one or more instances, the spear phishing management platform 110 may receive the VAP list from the email server 140 via the communication interface 113 and while the second data connection is established.

At step 213, the spear phishing management platform 110 may select an account from the VAP list (e.g., a first user account) and may identify message features for the account. In one or more instances, the spear phishing management platform 110 may automatically select the account from the VAP list (e.g., the spear phishing management platform 110 may randomly select the account from the VAP list, the spear phishing management platform 110 may sequentially select the account from the VAP list, or the like). In other instances, the account may be manually selected by a user of the spear phishing management platform 110 (e.g., by an administrative user, cyber security analyst, or the like).

In identifying the message features at step 213, the spear phishing management platform 110 and/or email server 140 may scan messages associated with the first user account over a predetermined period of time (e.g., three months), and identify, for example, a message sender, x-headers associated with the message, and/or message contents of historical messages associated with the first user account. In one or more instances, once the first user account has been selected, the spear phishing management platform 110 may identify whether primarily internal messages (e.g., messages sent from within the enterprise organization) or primarily external messages (e.g., messages sent from outside the enterprise organization such as by vendors, banks, or the like) are received at the first user account. If primarily external messages are received at the first user account, the spear phishing management platform 110 may identify particular retailers, vendors, banks, and/or other external contacts with which the first user account frequently communicates. Additionally or alternatively, the spear phishing management platform 110 may identify an average number of attachments sent from and/or received at the first user account, and/or may identify particular attachments that are frequently sent from or received at the first user account (e.g., a particular human resources handbook, or the like). Additionally or alternatively, the spear phishing management platform 110 may identify an average number of links sent from and/or received at the first user account, and may identify particular links that are frequently sent from and/or received at the first user account (e.g., a training manual related to a user of the first user account's role at the enterprise organization, or the like). Additionally or alternatively, the spear phishing management platform 110 may identify an average number of replies sent from the first user account to other accounts on a particular message chain. In identifying these message features based on their frequency, the spear phishing management platform 110 may compare identified message features to predetermined thresholds on a feature by feature basis (e.g., a particular bank has communicated with the first user account more than the predetermined threshold amount of times, or the like). In one or more instances, the spear phishing management platform 110 may identify the message features by accessing the message data stored at the email server 140.

In one or more instances, the spear phishing management platform 110 may generate numeric representations for each message feature (e.g., numbers of messages from each vendor, average number of attachments, etc.) and may use these numeric representations to generate a user profile indicative of message activity at the first user account. In some instances, in generating the user profile, the spear phishing management platform 110 may calculate, tabulate, and/or otherwise generate a feature vector containing a plurality of statistics and/or other numeric values corresponding to the features of messages that were sent and/or received at the first user account.

At step 214, the spear phishing management platform 110 may calculate a spear phishing score for the first user account. In calculating the spear phishing score for the first user account, the spear phishing management platform 110 may calculate a numeric representation of how susceptible a user of the first user account is to a spear phishing attack (e.g., based on his or her likelihood of receiving a spear phishing message and subsequently interacting with the spear phishing message). In some instances, the spear phishing management platform 110 may incorporate the message data described at step 206 and the message features identified at step 213 into the calculation of the spear phishing score.

For illustrative purposes, it may be assumed that the spear phishing scores are calculated on a scale of 1-10, with 1 being the least likely to be a spear phishing threat and 10 being the most likely. In this example, it may be assumed that at step 214, the spear phishing management platform 110 calculated a spear phishing score of 3/10 for the first user account, thus indicating that the user of the first user account is not likely susceptible to a spear phishing attack.

In one or more instances, in generating the spear phishing scores, the spear phishing management platform 110 may generate a security posture for the first user account indicating how likely a user of the first user account is to receive a spear phishing message and to subsequently interact with it, thus making himself or herself personally vulnerable, and/or (in the case of the user being an employee of the enterprise organization) exposing the enterprise organization to a cyberattack.

At step 215, the spear phishing management platform 110 may compare the first spear phishing score, calculated at step 214, to a predetermined spear phishing threshold. In one or more instances, the predetermined spear phishing threshold may be configured based on user input (e.g., specified by a cybersecurity analyst or other administrator via the administrator computing system 130). Additionally or alternatively, the spear phishing management platform 110 may automatically generate the predetermined spear phishing threshold to optimize a balance between predicted network security benefits with strain on processing resources (e.g., strain on processing resources may increase as additional spear phishing scores exceed the predetermined spear phishing threshold because additional processing steps are performed in these instances as described below). In one or more instances, the spear phishing management platform 110 may dynamically adjust the predetermined spear phishing threshold based on target percentages and/or machine learning algorithms. For example, the spear phishing management platform 110 may automatically set the predetermined spear phishing threshold at a value so as to flag fifty percent of the individuals on the VAP list. If however, in this example, more or less individuals are flagged as exceeding the predetermined spear phishing threshold, the spear phishing management platform 110 may adjust the predetermined spear phishing threshold accordingly (e.g., raise or decrease the bar so as to flag a number of individuals that is closer to the target percentage). Additionally or alternatively, the spear phishing management platform 110 may implement one or more machine learning algorithms and/or techniques to dynamically refine the predetermined spear phishing threshold. For example, if the spear phishing management platform 110 identifies that a number of individuals flagged as spear phishing risks did not in fact fall for the simulated spear phishing messages (as described further below), the spear phishing management platform 110 may determine that it was overly cautious in identifying susceptible spear phishing victims (e.g., which may cause unnecessary strain on processing resources by causing spear phishing messages to be sent to unnecessary target users). In this example, the spear phishing management platform 110 may determine that the predetermined spear phishing threshold should be raised, so as to heighten the threshold for individuals to be flagged as spear phishing risks and ultimately identify a smaller number of individuals. In contrast, if a number of individuals who were not flagged do fall for spear phishing messages (e.g., legitimate spear phishing messages as opposed to the test messages described below), the spear phishing management platform 110 may determine that the predetermined spear phishing threshold should be lowered, so as to identify and/or flag more individuals as potential risks.

For illustrative purposes, it may be assumed that the predetermined spear phishing threshold is 5/10. To follow the illustrative example from step 214, because the spear phishing management platform 110 generated a first spear phishing score of 3/10 for the first user account, the spear phishing management platform 110 may identify that the first spear phishing score does not exceed the predetermined spear phishing threshold (5/10).

Referring to FIG. 2D, at step 216, the spear phishing management platform 110 may determine, based on the determination at step 215, that the first spear phishing score did not exceed the predetermined spear phishing threshold, and thus that a spear phishing message should not be generated. For example, the spear phishing management platform 110 may determine that although the first user account was listed on the VAP list, he or she is not a threat to network security (e.g., although he or she may be frequently attacked, he or she is spear phish savvy and does not fall for spear phishing messages).

Accordingly, the spear phishing management platform 110 may identify whether or not any additional user accounts on the VAP list remain to be analyzed. If no additional user accounts remain to be analyzed, the event sequence may end. However, for illustrative purposes, it is assumed that the spear phishing management platform 110 identified a second user account on the VAP list for analysis. In determining that a second user account should be analyzed, the spear phishing management platform 110 may proceed to step 217.

At step 217, the spear phishing management platform 110 may identify message features for the second user account (which may e.g., be different from the message features for the first user account and may be indicative of historical message data specifically at the second user account). In doing so, the spear phishing management platform 110 may perform similar actions to those described above with regard to the first user account at step 213.

At step 218, the spear phishing management platform 110 may calculate a second spear phishing score for the second user account using the message features identified at step 217. In calculating the second spear phishing score, the spear phishing management platform 110 may perform actions similar to those described at step 214 with regard to calculating the first spear phishing score. For illustrative purposes, however, it may be assumed that at step 218, the spear phishing management platform 110 may generate a second spear phishing score of 8/10, indicating that the user of the second user account is more susceptible to a spear phishing attack than the user of the first user account (e.g., based on the message features).

At step 219, the spear phishing management platform 110 may compare the second spear phishing score to the predetermined spear phishing threshold. In comparing the second spear phishing score to the predetermined spear phishing threshold, the spear phishing management platform 110 may perform actions similar to those described above with regard to step 215. In comparing the second spear phishing score to the predetermined spear phishing threshold, however, the spear phishing management platform 110 may determine that the second spear phishing score (8/10) exceeds the predetermined spear phishing threshold (5/10).

Figure 2E:
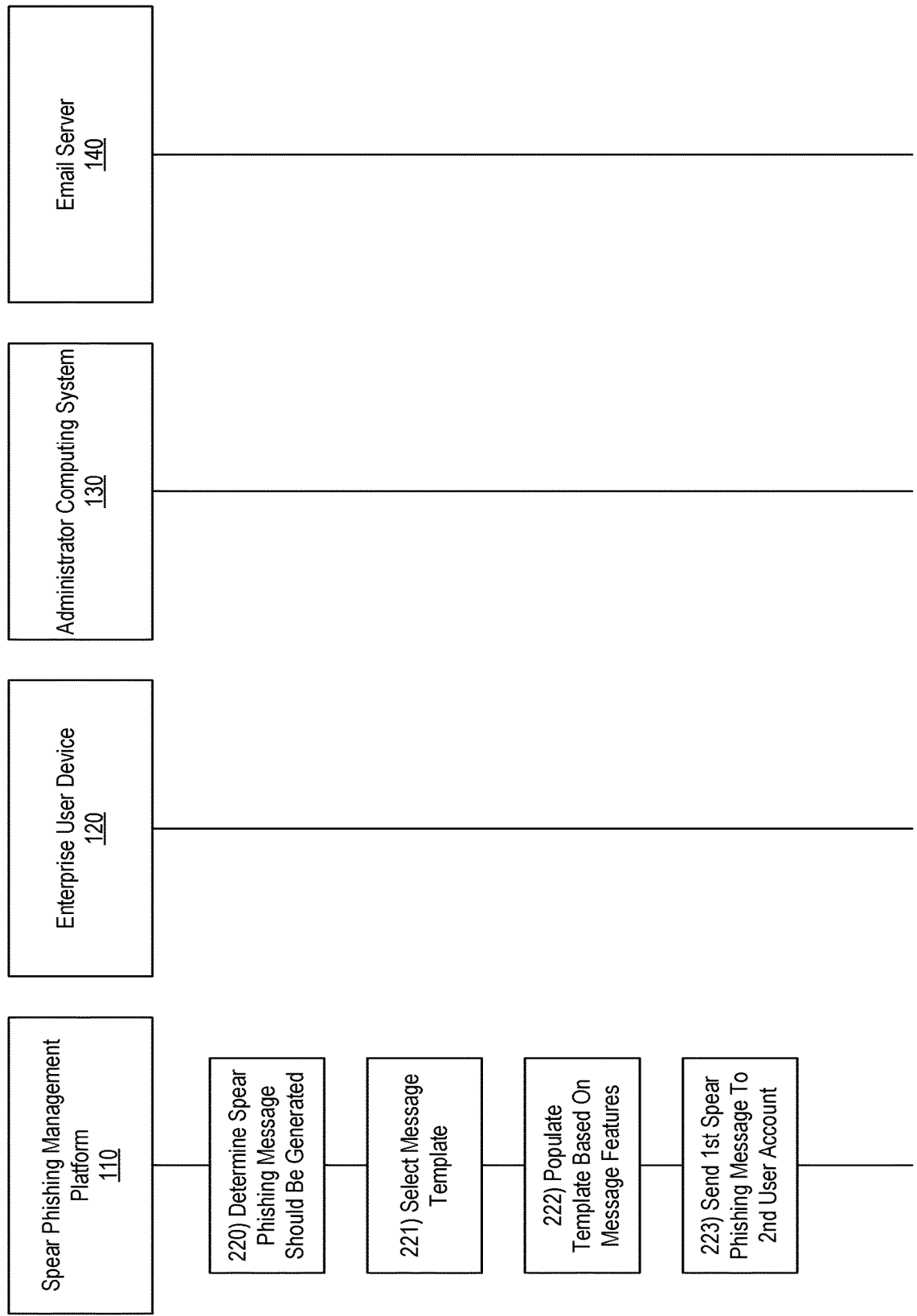

Referring to FIG. 2E, at step 220, the spear phishing management platform 110 may determine, based on the determination at step 219 that the second spear phishing score exceeds the predetermined spear phishing threshold, that a spear phishing message should be generated. For example, the spear phishing management platform 110 may identify that the second user account is susceptible and/or vulnerable to a spear phishing attack, and the spear phishing management platform 110 thus may determine that a simulated spear phishing message should be generated (e.g., internally generated) and sent to the second user account as a risk free test to evaluate a user of the second user account's ability to recognize, identify, and avoid spear phishing messages.

At step 221, the spear phishing management platform 110 may select a message template (e.g., from the one or more spear phishing message templates received at step 205). In some instances, the spear phishing management platform 110 may select a message template based on the message features and/or user profile for the second account identified at step 217. For example, the spear phishing management platform 110 may identify that a most common type of email received at the second user account are emails from a particular external vendor, and that these emails, on average, contain three links and two attachments. Accordingly, the spear phishing management platform 110 may select one of the one or more spear phishing message templates that matches these criteria (e.g., a template that appears to look like a message from the particular external vendor that contains three links and two attachments). In other instances, the spear phishing management platform 110 may randomly select one of the one or more spear phishing message templates. For example, the spear phishing management platform 110 may identify that the most common type of email messages received at the second user account are internal emails from an internal accounting department. In this example, the spear phishing management platform 110 may randomly select an internal-accounting template from a plurality of available internal account templates. By performing such random selection, the spear phishing management platform 110 may avoid sending the same spear phishing email to a large group of individuals and thus avoid tipping them off that the email is likely a simulated spear phishing attack.

As an example, the spear phishing management platform 110 may determine that the second user account frequently receives and transmits messages relating to purchase orders. In this example, the spear phishing management platform 110 may select (either specifically or randomly) one of the one or more spear phishing message templates related to purchase orders (which may e.g., contain fields, sections, and/or prompts for quantities, prices, addresses, and/or other information with purchase orders). The spear phishing management platform 110 then may generate a simulated spear phishing message using this selected template, as illustrated in greater detail below, to test the recipient user's ability to identify the message as a spear phishing message that should be reported, deleted, and/or otherwise avoided.

At step 222, the spear phishing management platform 110 may populate the message template, selected at step 221, based on the message features and/or user profile for the second user account identified at step 217. For example, based on the message features for the second user account, the spear phishing management platform 110 may identify a sender, a subject line, and/or message content and may populate the message template with this information (e.g., so as to generate a message resembling one that would be anticipated by the second user account). In some instances, the spear phishing management platform 110 may insert a signature block corresponding to the identified sender and/or perform other actions to populate the message template. In doing so, the spear phishing management platform 110 may generate a first spear phishing message targeting the second user account that is based on a user profile and/or message features associated with the second user account, and accordingly, might not be recognizable to a user of the second user account as a spear phishing message (e.g., because the first spear phishing message may resemble a typical message that would be received by the second user account). For example, the spear phishing management platform 110 may populate the message template by including common information (e.g., company addresses, logos, signatures, or the like), frequently transmitted and/or relevant links and/or attachments, or the like.

In some instances, in identifying the message content, the spear phishing management platform 110 may determine that a short and relatively non-specific message should be sent as an initial test, and then may determine that more in-depth tailored content should be included in a second spear phishing message (as described below) if a reply is received to the first spear phishing message. For example, the spear phishing management platform 110 may determine that a soft opener and/or minor request should be included in the first spear phishing message, and that a more urgent and/or important request should be held back and included in the second spear phishing message. In this example, the spear phishing management platform 110 may compose a series of progressively more specific messages directed towards a particular topic relevant to the selected template (e.g., each of which may request increasingly more sensitive information). For example, the spear phishing management platform 110 may compose the following messages in sequential order to an individual who frequently sends and receives accounting messages: "Who approves purchases?" "Where do I submit invoices?" "Can I get an invoice?" "Can you approve my invoice?" Additionally or alternatively, the spear phishing management platform 110 may compose the following messages in sequential order: "Who is your boss?" "How many employees are there at your company?" "How is the deal going?" "Can I get the internal working draft of your quarterly earnings report?" As yet another example, the spear phishing management platform 110 may compose the following messages in sequential order: "Do you have another email?" "Can you please reset your password?" "Can you please update your information?" "Can I get your social security number?" As is demonstrated in these examples, the earlier sent messages may be fairly non-specific and/or request relatively harmless information. Then, once there is an established conversation with the second user account, the spear phishing messages may begin to request more sensitive and/or confidential information. Thus, in some embodiments, content of a first spear phishing message may have a first level of specificity that is determined by the computing platform based on the message features of the messages associated with the user, and content of a second spear phishing message may have a second level of specificity that is greater than the first level of specificity and determined by the computing platform based on the message features of the messages associated with the user. These examples are meant to be illustrative, and other potential spear phishing messages may be sent (e.g., by the spear phishing management platform 110) in other instances.

At step 223, the spear phishing management platform 110 may send the first spear phishing message, generated at step 222, to the second user account. In some instances, the spear phishing management platform 110 may send the first spear phishing message via the communication interface 113.

Figure 2F:
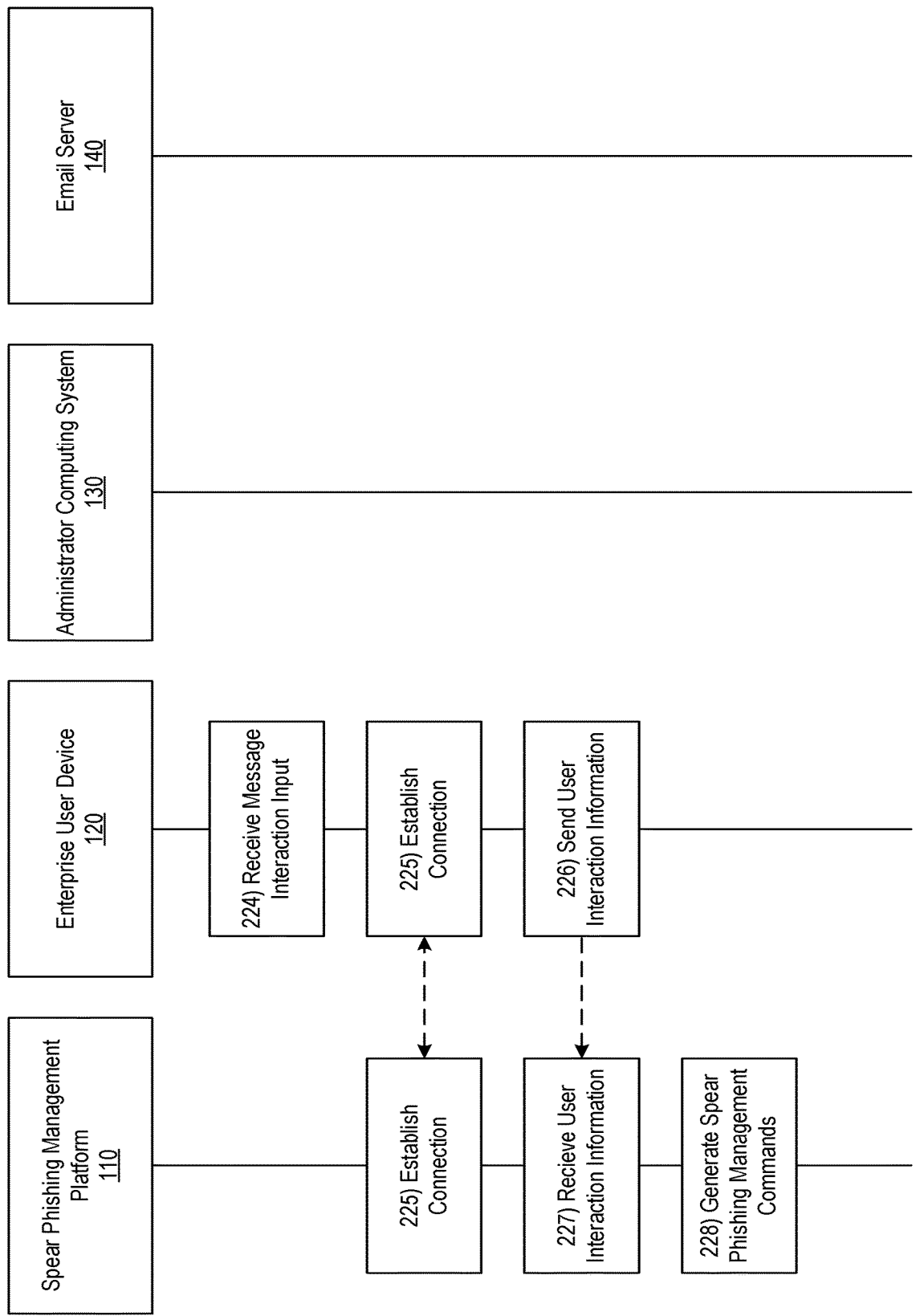

Referring to FIG. 2F, at step 224, the enterprise user device 120 may access the first spear phishing message and may receive a message interaction input from a user of the second user account. For example, the enterprise user device 120 may receive user input transcribing a reply to the first spear phishing message or otherwise interacting with the first spear phishing message (e.g., opening a link, attachment, or the like).

At step 225, the enterprise user device 120 may establish a connection with spear phishing management platform 110. In one or more instances, the enterprise user device 120 may establish a third connection with spear phishing management platform 110 to link the enterprise user device 120 to the spear phishing management platform 110.

At step 226, the enterprise user device 120 may send, share, or otherwise provide the user interaction information received at step 224 to the spear phishing management platform 110. In one or more instances, the enterprise user device 120 may send the user interaction information to the spear phishing management platform 110 while the third data connection is established. In some instances, a monitoring agent running on the enterprise user device 120 may provide the user interaction information to the spear phishing management platform 110. In other instances, the enterprise user device 120 may provide the user interaction information to the spear phishing management platform 110 based on receiving a reply and/or other user input from a user of the enterprise user device 120 responding to the first spear phishing message (and thus, e.g., the corresponding response being sent from the enterprise user device 120 to the spear phishing management platform 110 via the email server 140).

At step 227, the spear phishing management platform 110 may receive or otherwise access the user interaction information sent at step 226. In one or more instances, the spear phishing management platform 110 may receive the user interaction information via the communication interface 113 and while the third data connection is established. In some instances, the spear phishing management platform 110 may apply one or more natural language processing algorithms to a reply message received from the second user account, and may automatically generate a reply accordingly (e.g., a second spear phishing message) to be sent back to the second user account. In some instances, the spear phishing management platform 110 may generate the second spear phishing message using techniques similar to those described above with regard to generation of the first spear phishing message at steps 221 and 222. In these instances, the spear phishing management platform 110 may select a new message template or may use a subsequent message template, linked to the message template selected at step 221, to generate the second spear phishing message.

At step 228, the spear phishing management platform 110 may generate one or more spear phishing management commands directing a spear phishing mitigation action. In one or more instances, based on the user interaction information received at step 227, the spear phishing management platform 110 may determine that a spear phishing mitigation action should be performed, and may generate the one or more spear phishing management commands accordingly. For example, in one or more instances, in generating the spear phishing management commands, the spear phishing management platform 110 may generate one or more commands directing a recipient computing device to launch a spear phishing training page module (e.g., to train a user who interacted with the spear phishing message to recognize and avoid such messages in the future), cause display of an alert, generate a user interface, or the like. In these instances, the spear phishing management platform 110 may generate one or more commands directed towards one or more of the spear phishing management platform 110 itself, the enterprise user device 120, the administrator computing system 130, and/or other systems and devices.

Figure 2G:
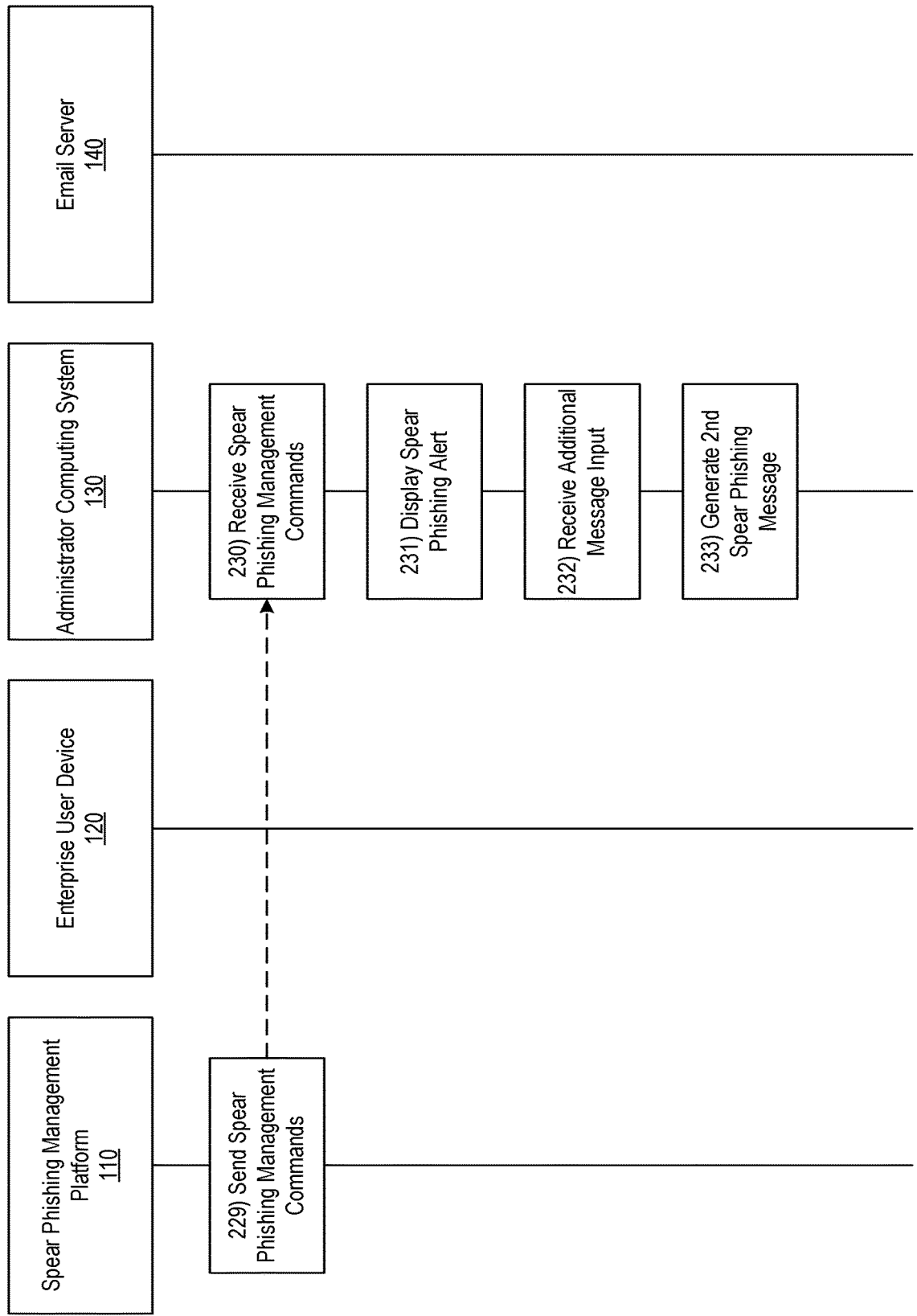

Referring to FIG. 2G, at step 229, the spear phishing management platform 110 may send, share, or otherwise provide the one or more spear phishing management commands generated at step 228 to, for example, the administrator computing system 130. In one or more instances, the spear phishing management platform 110 may send the one or more spear phishing management commands via the communication interface 113 and while the first data connection is established. For instance, the spear phishing management platform 110 may send the one or more spear phishing management commands to the administrator computing system 130 to alert a cybersecurity analyst or an administrative user that a message recipient fell victim to a simulated spear phishing attack. It should be understood that at step 229, the spear phishing management platform 110 may, additionally or alternatively, send, share, or otherwise provide the one or more spear phishing management commands to a different computing device (e.g., enterprise user device 120, or the like) or may direct the one or more spear phishing management commands to itself. For instance, instead of or in addition to sending the commands to the administrator computing system 130, the spear phishing management platform 110 may send the one or more spear phishing management commands to the enterprise user device 120 to inform the user that they fell victim to a simulated spear phishing attack and that they should and/or must complete one or more training modules to help them recognize and avoid such messages in the future, as illustrated in greater detail below.

At step 230, the administrator computing system 130 may receive or otherwise access the one or more spear phishing management commands sent at step 229. In one or more instances, the administrator computing system 130 may receive the one or more spear phishing management commands while the first data connection is established.

Figure 3:
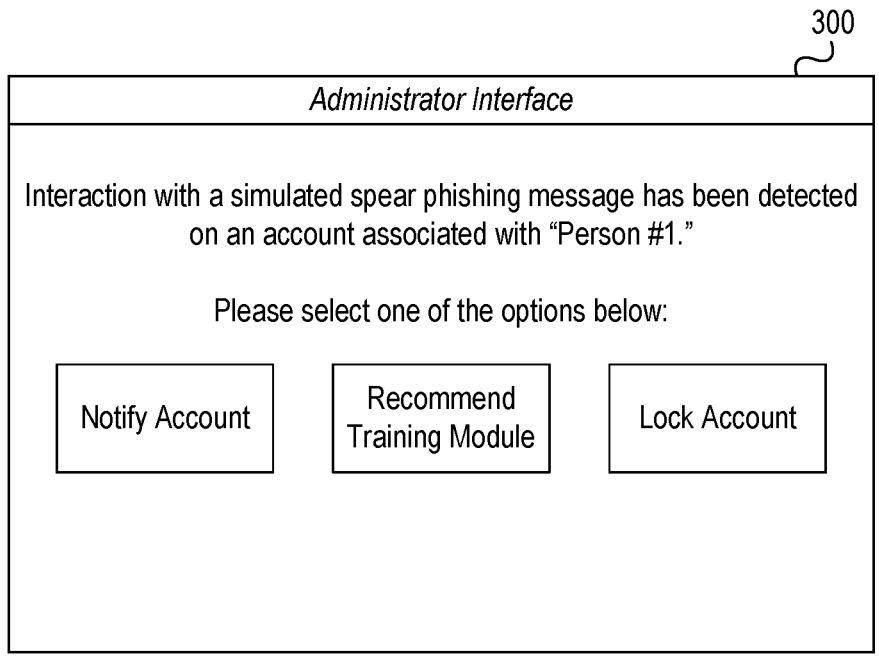
FIGS. 3 and 4 depict illustrative user interfaces for using machine learning to dynamically initiate and manage automated spear phishing in enterprise computing environments in accordance with one or more example embodiments.

At step 231, the administrator computing system 130 may display a spear phishing alert based on the one or more spear phishing management commands received at step 230. In one or more instances, in displaying the spear phishing alert, the administrator computing system 130 may display a graphical user interface similar to graphical user interface 300, which is illustrated in FIG. 3. For example, the administrator computing system 130 may display an interface indicating that an interaction was detected with the first spear phishing message, and may indicate one or more options for a user of the administrator computing system 130 (e.g., a cybersecurity administrator, analyst, or the like), such as notify the second user account (e.g., via an email notification or the like), recommend a training module directed towards spear phishing awareness, lock the second user account, or the like. It should be understood that this is not an exhaustive list, and other options may be presented to the user of the administrator computing system 130 on the graphical user interface 300 in alternative arrangements.

At step 232, the administrator computing system 130 may receive user input indicating a second spear phishing message. In receiving the user input indicating the second spear phishing message, the administrator computing system 130 may receive user input from an administrator or cybersecurity analyst to transcribe or otherwise generate a second simulated spear phishing message for the second user account.

At step 233, the administrator computing system 130 may generate the second spear phishing message based on the user input received at step 232. In some instances, in addition to or instead of determining the second spear phishing message based on the user input received at step 232, the administrator computing system 130 and/or the spear phishing management platform 110 may automatically generate the second spear phishing message (e.g., by performing actions similar to those described above at steps 221 and 222). In some instances, in generating the second spear phishing message, the administrator computing system 130 may generate a spear phishing message that is more detailed and personally tailored than the first spear phishing message. For example, administrator computing system 130 may determine that a soft opener and/or minimal request should be included in the first spear phishing message, and that a more urgent and/or important request should be held back until (but then included in) the second spear phishing message. As an example, the first spear phishing message, sent at step 223 may merely state "Hey Person #1 . . . ," whereas subsequent spear phishing messages such as the second spear phishing message may state "Thanks Person #1, could you . . . " or "Please Person #1, I really need . . . " In some instances, with regard to the first and second spear phishing messages, the administrator computing system 130 and/or the spear phishing management platform 110 may perform reply triggered phishing (e.g., send an initial email with no threat, and upon receiving a reply the system may automatically send a following up phishing email), multi-sender phishing (e.g., send an initial email with no threat, indicating a second sender will be contacting the recipient about an urgent matter and send a second email from the second sender referencing the first sender as a phishing message), drip campaign phishing (e.g., send initial emails with or without threat inviting contact, continually send follow up messages on a fixed schedule until a target recipient reports or clicks on something in the messages, and trigger the sending of a phishing email in response to receiving a reply), and/or multi-threat vector phishing (e.g., send initial SMS/email message with no threat, indicating a subsequent email/SMS message will be sent as a follow up regarding an urgent matter, and send the subsequent message as the phishing message).

In one or more instances, in generating the second spear phishing message, the administrator computing system 130 may apply one or more natural language processing algorithms to a reply message received from the second user account (e.g., based on the user interaction information received at step 227), and may automatically generate a reply accordingly (e.g., a second spear phishing message) to be sent back to the second user account. Additionally, or alternatively, in generating the second spear phishing message, the administrator computing system 130 may identify, by accessing an internal database configured to store personal details about the one of the identified users, personal details about the second user account, and may generate the second spear phishing message based in part on the personal details. In additional or alternative arrangements, instead of the administrator computing system 130 generating the second spear phishing message, the spear phishing management platform 110 may generate the second spear phishing message (e.g., using the techniques described above with regard to generation of the second spear phishing message by the administrator computing system 130).

Figure 2H:
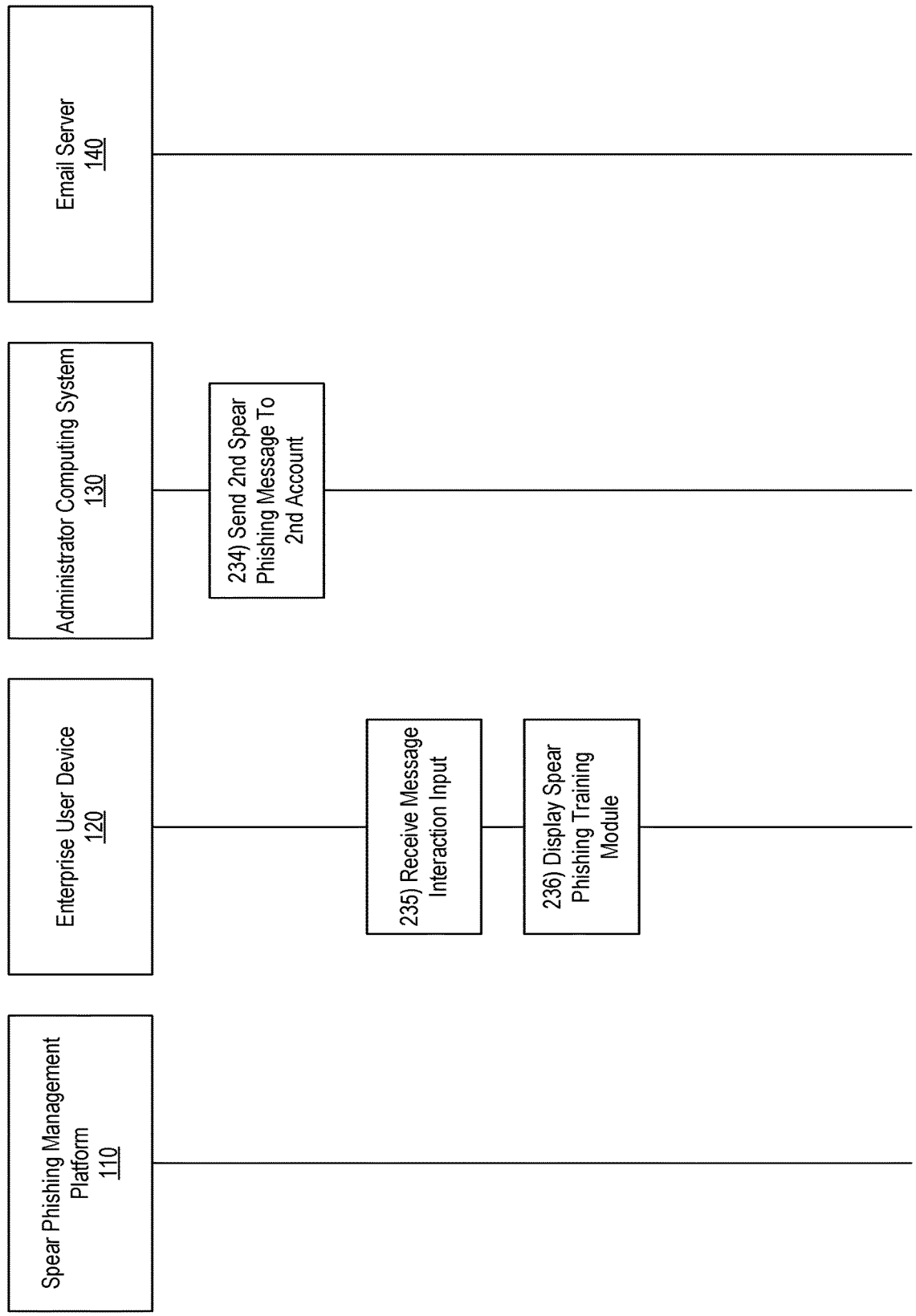

Referring to FIG. 2H, at step 234, the administrator computing system 130 may send, share, or otherwise provide the second spear phishing message to the second user account. At step 235, the enterprise user device 120 may receive an input indicating an interaction with the second spear phishing message. Based on the input indicating the interaction with the second spear phishing message, the enterprise user device 120 may determine that a user of the enterprise user device 120 interacted with the second spear phishing message (e.g., sent a reply, launched a link, opened an attachment, or the like).

Figure 4:
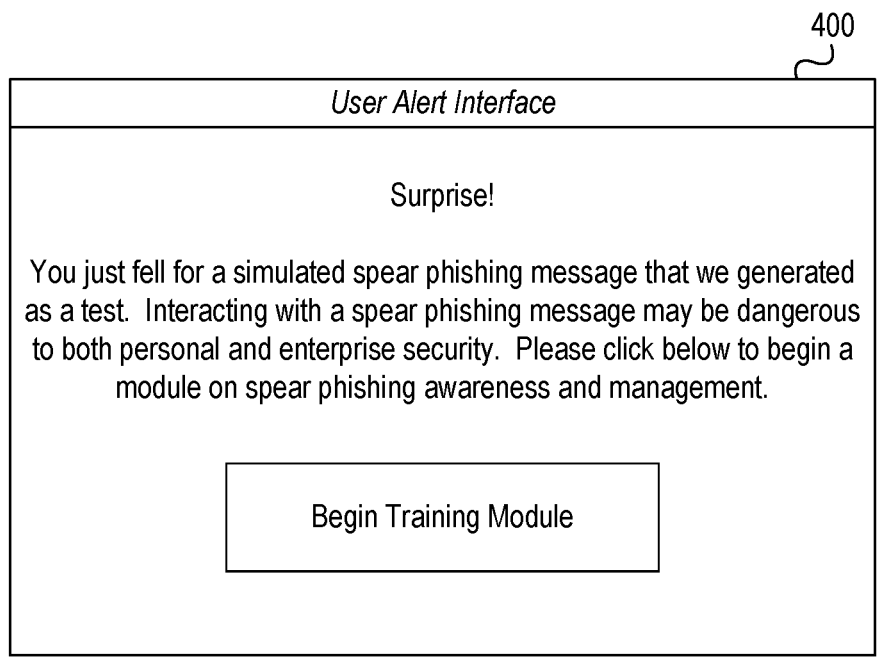

At step 236, based on the determination at step 235 that the user of the enterprise user device 120 interacted with the second spear phishing message, the enterprise user device 120 may automatically launch a spear phishing training module. In one or more instances, in launching the spear phishing training module, the enterprise user device 120 may display a graphical user interface similar to graphical user interface 400, which is shown in FIG. 4. For example, the enterprise user device 120 may display an indication that the user interacted with an internally generated spear phishing message to test his or her awareness and sensitivity to spear phishing messages. The enterprise user device 120 may indicate that based on the user's interaction, it is requested that the user complete a module on spear phishing awareness. In some instances, the enterprise user device 120 and/or another computing device may lock the second user account until the training module is complete. In other instances, the enterprise user device 120 may indicate that the module is recommended, but is ultimately optional.

It should be understood that the steps described in the illustrative event sequence herein may be performed in any alternative sequence or order without departing from the scope of the disclosure. Furthermore, although a single enterprise user devices and two user accounts are described, it should be understood that any number of user accounts and devices may be involved in the methods described herein. Finally, although the steps described in the illustrative event sequence herein are described primarily in terms of email messages, it should be understood that other types of messages (e.g., text messages, instant messages, etc.) may be processed using the systems and methods described herein without departing from the scope of the disclosure, and furthermore that other alternative actions and/or response measures may be taken in response to determining the spear phishing messages and their corresponding interactions.

Figure 5:
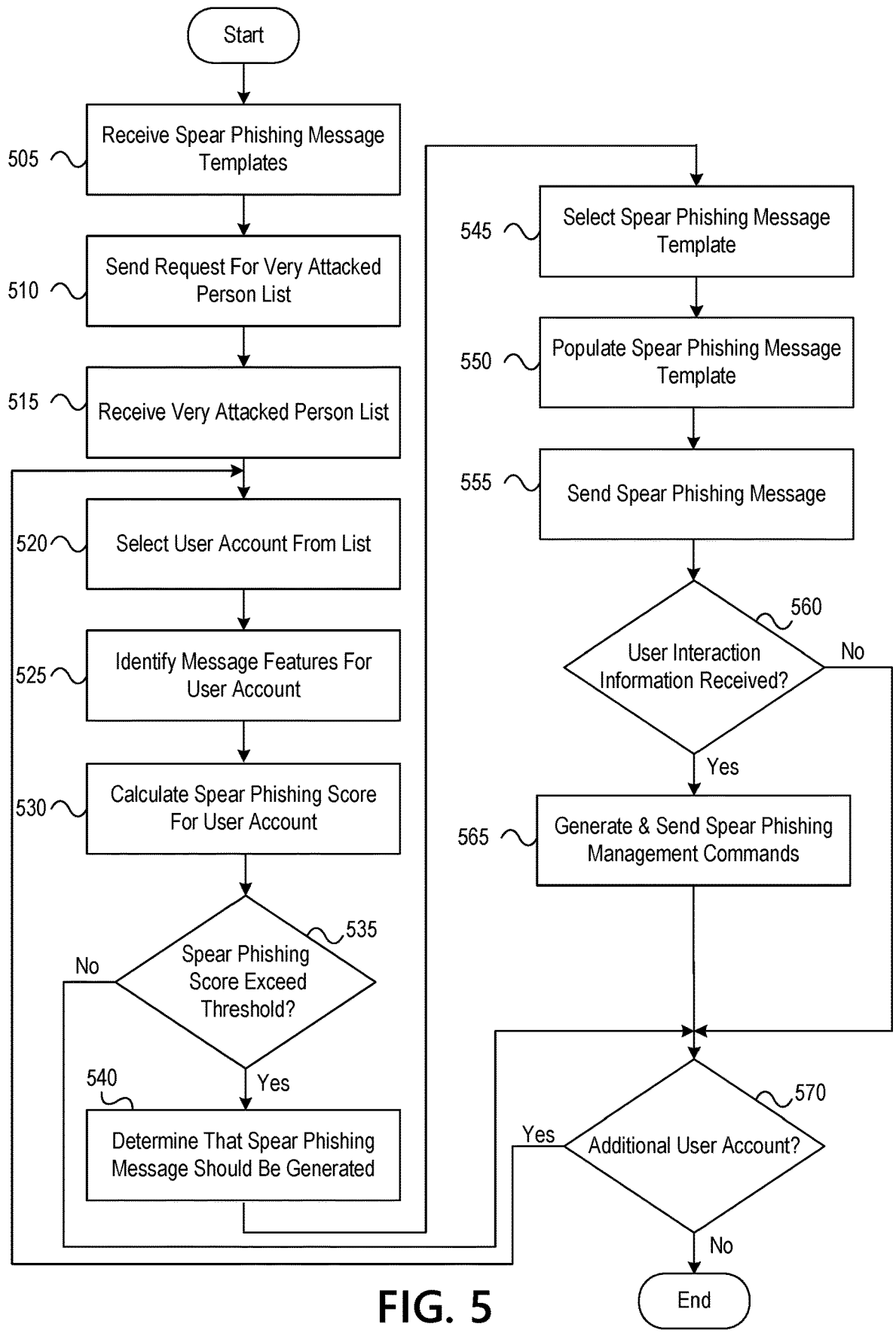
FIG. 5 depicts an illustrative method for using machine learning to dynamically initiate and manage automated spear phishing in enterprise computing environments in accordance with one or more example embodiments.

FIG. 5 depicts an illustrative method for using machine learning to dynamically initiate and manage automated spear phishing in enterprise computing environments in accordance with one or more example embodiments. Referring to FIG. 5, at step 505, a computing platform having at least one processor, a communication interface, and memory may receive one or more spear phishing message templates. At step 510, the computing platform may send a request for a VAP list. At step 515, the computing platform may receive the VAP list. At step 520, the computing platform may select a user account from the VAP list. At step 525, the computing platform may identify one or more message features for the user account based on message data. At step 530, the computing platform may calculate a spear phishing score for the user account based on the message features. At step 535, computing platform may identify whether or not the spear phishing score exceeds a predetermined spear phishing threshold. If the spear phishing score does not exceed the predetermined spear phishing threshold, the computing platform may proceed to step 570. If the spear phishing score does exceed the predetermined spear phishing threshold, the computing platform may proceed to step 540.

At step 540, the computing platform may determine that a spear phishing message should be generated. At step 545, the computing platform may select a spear phishing message template from the spear phishing message templates received at step 505. At step 550, the computing platform may populate the spear phishing message template based on the message features. At step 555, the computing platform may send the spear phishing message to the user account. At step 560, the computing platform may identify whether or not a user of the user account interacted with the spear phishing message. If user interaction information was not received, the computing platform may proceed to step 570. If user interaction information was received, the computing platform may proceed to step 565. At step 565, the computing platform may generate and send one or more spear phishing management commands. At step 570, the computing platform may identify whether or not any additional user accounts on the VAP list should be analyzed. If additional user accounts should be analyzed, the computing platform may return to step 520. If additional user accounts should not be analyzed, the method may end.

Accordingly, by performing the methods described herein, systems may simulate more realistic and sophisticated spear phishing attacks for employees, customers, and/or other users, so as to increase network security by providing enhanced cybersecurity training to such users. Furthermore, by implementing machine learning techniques and identifying message features and/or user profiles associated with a user, generation of realistic spear phishing messages may be automated in full or in part. Even further, by automatically generating spear phishing training modules for individuals identified as significant risks, the systems and methods presented herein may reduce processing resources needed to analyze and/or provide training to other individuals who might not need additional training (e.g., because they are not frequently attacked, not susceptible to attack, or the like) and may increase network security by providing targeted training to individuals who appear most susceptible, thereby enabling such individuals to better recognize spear phishing messages in the future.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   identify a plurality of users to receive one or more simulated spear phishing messages;
   identify, based on historical message data associated with a first user of the plurality of users identified to receive the one or more simulated spear phishing messages, message features of messages associated with the first user;
   generate, using a predetermined template and for a first user account linked to the first user, a first spear phishing message based on the message features of the messages associated with the first user;
   send, to the first user account, the first spear phishing message;
   receive, from the first user account, a reply message to the first spear phishing message; and
   send, to the first user account, a second spear phishing message, wherein:
   content of the first spear phishing message has a first level of specificity determined by the computing platform based on the message features of the messages associated with the first user, wherein the first level of specificity comprises a general introductory message, and
   content of the second spear phishing message has a second level of specificity greater than the first level of specificity and determined by the computing platform based on the message features of the messages associated with the first user, wherein the second level of specificity comprises a specific ask of the first user.

2. The computing platform of claim 1, wherein the memory stores additional computer-readable instructions that, when executed by the at least one processor, cause the computing platform to:
   prior to identifying the plurality of users to receive the one or more simulated spear phishing messages, receive a very attacked persons (VAP) list, wherein identifying the plurality of users to receive the one or more simulated spear phishing messages comprises identifying the plurality of users to receive the one or more simulated spear phishing messages based on the VAP list.

3. The computing platform of claim 2, wherein the memory stores additional computer-readable instructions that, when executed by the at least one processor, cause the computing platform to:
   update, at a predetermined interval, the VAP list.

4. The computing platform of claim 1, wherein the memory stores additional computer-readable instructions that, when executed by the at least one processor, cause the computing platform to:
   determine a spear phishing score for the first user account linked to the first user; and
   generate, based on a determination that the spear phishing score for the first user account linked to the first user exceeds a predetermined threshold, the first spear phishing message.

5. The computing platform of claim 1, wherein identifying the plurality of users to receive the one or more simulated spear phishing messages comprises identifying the plurality of users to receive the one or more simulated spear phishing messages based on each user of the plurality of users having security posture characteristics that meet predetermined security posture criteria.

6. The computing platform of claim 1, wherein the memory stores additional computer-readable instructions that, when executed by the at least one processor, cause the computing platform to:
  receive first user interaction information indicating an initial interaction with the first spear phishing message; and
  in response to receiving the first user interaction information, send, to the first user account, a message indicating first spear phishing training to be completed by the first user.

7. The computing platform of claim 6, wherein the memory stores additional computer-readable instructions that, when executed by the at least one processor, cause the computing platform to:
  receive second user interaction information indicating a second interaction with the first spear phishing message; and
  in response to receiving the second user interaction information, send, to the first user account, a message indicating second spear phishing training to be completed by the first user.

8. The computing platform of claim 1, wherein the message features of the messages associated with the first user include one or more of: a quantity of messages received from external accounts, a quantity of messages received from internal accounts, information about the external accounts, information about the internal accounts, an average number of attachments, information about the attachments, the attachments themselves, an average number of links, information about the links, the links themselves, or an average number of replies sent on a message string.

9. The computing platform of claim 1, wherein generating the first spear phishing message comprises:
  automatically selecting the predetermined template;
  directing an administrator computing system to cause display of the predetermined template;
  receiving user input indicating text to be included in the first spear phishing message; and
  creating the first spear phishing message based on the user input and the predetermined template.

10. The computing platform of claim 1, wherein the memory stores additional computer-readable instructions that, when executed by the at least one processor, cause the computing platform to:
  analyze, using one or more natural language processing (NLP) algorithms, the reply message; and
  generate, based on the NLP analysis of the reply message, the second spear phishing message.

11. The computing platform of claim 1, wherein the memory stores additional computer-readable instructions that, when executed by the at least one processor, cause the computing platform to:
  identify, by accessing an internal database configured to store personal details about the first user, personal details corresponding to the first user, wherein generating the first spear phishing message comprises generating, based in part on the personal details corresponding to the first user, the first spear phishing message.

12. The computing platform of claim 1, wherein the memory stores additional computer-readable instructions that, when executed by the at least one processor, cause the computing platform to select, based on the message features of the messages associated with the first user, the predetermined template prior to generating the first spear phishing message based on the message features.

13. The computing platform of claim 1, wherein the memory stores additional computer-readable instructions that, when executed by the at least one processor, cause the computing platform to:
  select, based on historical message data associated with an enterprise organization with which the first user is affiliated, the predetermined template, wherein generating the first spear phishing message comprises inputting information specific to the first user, based on the message features, into the predetermined template.

14. A method, comprising:
  at a computing platform comprising at least one processor, a communication interface, and memory:
    identifying, by the at least one processor, a plurality of users to receive one or more simulated spear phishing messages;
    identifying, by the at least one processor, based on historical message data associated with a first user of the plurality of users identified to receive the one or more simulated spear phishing messages, message features of messages associated with the first user;
    generating, by the at least one processor, using a predetermined template and for a first user account linked to the first user, a first spear phishing message based on the message features of the messages associated with the first user;
    sending, by the at least one processor, to the first user account, the first spear phishing message;
    receiving, from the first user account, a reply message to the first spear phishing message; and
    sending, to the first user account, a second spear phishing message, wherein:
      content of the first spear phishing message has a first level of specificity determined by the computing platform based on the message features of the messages associated with the first user, wherein the first level of specificity comprises a general introductory message, and
      content of the second spear phishing message has a second level of specificity greater than the first level of specificity and determined by the computing platform based on the message features of the messages associated with the first user, wherein the second level of specificity comprises a specific ask of the first user.

15. The method of claim 14, comprising:
  prior to identifying the plurality of users to receive the one or more simulated spear phishing messages, receiving, by the at least one processor, a very attacked persons (VAP) list, wherein identifying the plurality of users to receive the one or more simulated spear phishing messages comprises identifying the plurality of users to receive the one or more simulated spear phishing messages based on the VAP list.

16. The method of claim 15, comprising:
  updating, by the at least one processor, at a predetermined interval, the VAP list.

17. The method of claim 14, comprising:
  determining, by the at least one processor, a spear phishing score for the first user account linked to the first user; and
  generate, by the at least one processor, based on a determination that the spear phishing score for the first user account linked to the first user exceeds a predetermined threshold, the first spear phishing message.

18. The method of claim 14, wherein identifying the plurality of users to receive the one or more simulated spear phishing messages comprises identifying the plurality of users to receive the one or more simulated spear phishing messages based on each user of the plurality of users having security posture characteristics that meet predetermined security posture criteria.

19. The method of claim 14, comprising:
receiving, by the at least one processor, first user interaction information indicating an initial interaction with the first spear phishing message; and
in response to receiving the first user interaction information, sending, by the at least one processor, to the first user account, a message indicating first spear phishing training to be completed by the first user.

20. One or more non-transitory computer-readable media storing instructions that, when executed by a computing platform comprising at least one processor, a communication interface, and memory, cause the computing platform to:
identify a plurality of users to receive one or more simulated spear phishing messages;
identify, based on historical message data associated with a first user of the plurality of users identified to receive the one or more simulated spear phishing messages, message features of messages associated with the first user;
generate, using a predetermined template and for a first user account linked to the first user, a first spear phishing message based on the message features of the messages associated with the first user;
send, to the first user account, the first spear phishing message;
receive, from the first user account, a reply message to the first spear phishing message; and
send, to the first user account, a second spear phishing message, wherein:
content of the first spear phishing message has a first level of specificity determined by the computing platform based on the message features of the messages associated with the first user, wherein the first level of specificity comprises a general introductory message, and
content of the second spear phishing message has a second level of specificity greater than the first level of specificity and determined by the computing platform based on the message features of the messages associated with the first user, wherein the second level of specificity comprises a specific ask of the first user.

* * * * *